US006982885B2

(12) United States Patent
Huang

(10) Patent No.: US 6,982,885 B2
(45) Date of Patent: Jan. 3, 2006

(54) CURRENT DISTRIBUTION CIRCUIT

(75) Inventor: Chih-Hsiung Huang, Taoyuan Shien (TW)

(73) Assignee: Delta Electronics, Inc., (TW)

( * ) Notice: Subject to any disclaimer, the term of this patent is extended or adjusted under 35 U.S.C. 154(b) by 0 days.

(21) Appl. No.: 10/962,781

(22) Filed: Oct. 12, 2004

(65) Prior Publication Data

US 2005/0141156 A1 Jun. 30, 2005

(30) Foreign Application Priority Data

Dec. 30, 2003 (TW) .............................. 92137537 A

(51) Int. Cl.
*H02M 7/00* (2006.01)

(52) U.S. Cl. ........................................................ 363/65

(58) Field of Classification Search .................. 363/65, 363/71, 72; 307/82
See application file for complete search history.

(56) References Cited

U.S. PATENT DOCUMENTS 4,890,213 A * 12/1989 Seki ............................ 363/49
5,157,269 A * 10/1992 Jordan et al. ................. 307/59
5,521,809 A * 5/1996 Ashley et al. ................ 363/71
6,346,798 B1 * 2/2002 Passoni et al. .............. 323/272
6,862,200 B2 * 3/2005 Sullivan et al. ............... 363/65
6,903,946 B1 * 6/2005 Wu ............................. 363/65

* cited by examiner

*Primary Examiner*—Adolf Berhane
(74) *Attorney, Agent, or Firm*—Volpe And Koenig, P.C.

(57) ABSTRACT

The present invention provides a current distribution circuit for parallel power supplies, wherein the power supplies includes at least a first power supply and a second power supply. The current distribution circuit includes a voltage amplifier, a power converting unit, a current detecting unit, an equivalent diode, a regulable amplifier, an adding unit and a soft-start circuit.

15 Claims, 12 Drawing Sheets

CURRENT DISTRIBUTION CIRCUIT

FIELD OF THE INVENTION

This invention relates to a current distribution circuit, and more particular to a current distribution for parallel power supplies.

BACKGROUND OF THE INVENTION

Please refer to FIG. 1(*a*) showing the conventional master-slave circuit for parallel power supplies. The master-slave current distribution circuit 1 includes the voltage amplifier 11, the impedance 12, the power converting unit 13, the current detecting unit 14, the equivalent diode 15, the regulable amplifier 16 and the adding unit 17. The master-slave current distribution circuit is electrically connected to the parallel power supplies PS1 and PS2, so that the voltage and the current output from the power supplies PS1 and PS2 are stably distributed.

When the power supply PS1 outputs and then the power supply PS2 is connected to the power supply PS1 in parallel by hot plugging, the overshoot surge is formed on the output voltage waveform of the power supply PS1 as shown in FIG. 1(*b*). However, the regulable output ΔV of the regulable amplifier 16 is added on the output voltage $V_0$ via the current distribution circuit 1, so that the surge is present on the output voltage of the parallel power supplies and the quality of the power supplies are unstable. In order to overcome the disadvantage, there are two methods provided as follows in the prior art.

(1) The maximal value $\Delta V_{max}$ of the regulable output of the regulable amplifier 16 is lowered, so that the surge on the output voltage $V_0+\Delta V_{max}$ of the parallel power supplies is lowered. However, if the $\Delta V_{max}$ is lowered to be less than the voltage difference between the power supplies PS1 and PS2, the power supplies PS1 and PS2 can not form the parallel connection, and furthermore the master-slave current distribution circuit can not operate. Therefore, it is limited to lower the $\Delta V_{max}$ of the regulable output by the above method.

(2) A soft-start circuit is added in the master-slave current distribution circuit 1 to lower the surge formed on the parallel power supplies. Please refer to FIG. 1(*c*) showing the surge of the parallel current distribution circuit lowered by the soft-start circuit. The operation starting point of the soft-start circuit is the point a on the FIG. 1(*c*), i.e. the operation starting point is not at zero, and the soft-start circuit is operated when the output voltage $V_0$ is output from the parallel power supplies, so that the function of the soft-start circuit is not completely performed and some surge is still formed. The level of the surge depends on the raising time of the output voltage of the power supply PS2, and the level of the surge is higher when the raising time is shorter.

In order to overcome the disadvantages of the prior art described above, the present invention provides a current distribution circuit, which can eliminate the surge formed on the parallel power supplies.

SUMMARY OF THE INVENTION

It is an aspect of the present invention to provide a current distribution circuit for parallel power supplies, wherein the power supplies include at least a first power supply and a second power supply. The current distribution circuit of the present invention includes a voltage amplifier, a power converting unit having an input electrically connected to an output of the voltage amplifier and having an output electrically connected to a load, a current detecting unit having an input electrically connected to the output of the power converting unit and the load, an equivalent diode having an input electrically connected to an output of the current detecting unit and having an output electrically connected to the parallel power supplies, a regulable amplifier having an inverting input electrically connected to the output of the current detecting unit and the input of the equivalent diode, and having a non-inverting input electrically connected to the output of the equivalent diode and the parallel power supplies, an adding unit electrically connected to a non-inverting input of the voltage amplifier and an output of the regulable amplifier, and a soft-start circuit electrically connected to the voltage amplifier and the regulable amplifier. In accordance with the present invention, when the second power supply is operated after the first power supply, an output voltage output from the current distribution circuit to the load is fedback to the soft-start circuit, so that the soft-start circuit is driven and has a voltage, and when a value of the voltage is equal to a proportional value of the output voltage, a surge voltage of the output voltage is lowered.

In accordance with the present invention, the current distribution circuit is a master-slave circuit.

In accordance with the present invention, the voltage amplifier further has a negative feedback circuit.

In accordance with the present invention, the negative feedback circuit includes an impedance.

In accordance with the present invention, the proportional value is in a range from 90% to 95% of the output voltage.

Preferably, the current distribution circuit further includes a modulating unit between the output of the current detecting unit and the non-inverting input of the regulable amplifier for modulating an energy gap voltage between the output of the current detecting unit and the non-inverting input of the regulable amplifier.

In accordance with the present invention, the energy gap voltage is raised by the modulating unit when a first value of the load is less than a predetermined value, and is lowered by the modulating unit when a second value of the load is more than the predetermined value, so that an unstability formed from the first power supply and the second power supply under a light load is eliminated.

In accordance with the present invention, the output of the current detecting unit is further electrically connected to an active droop unit.

In accordance with the present invention, a reference value of an operating voltage of the current distribution circuit is decreased by the active droop unit when a value of the load is less than the predetermined value, so that an error formed from the first power supply and the second power supply under the light load is decreased.

In accordance with the present invention, the reference value is 1%~5% of a value of the output voltage.

It is another aspect of the present invention to provide a current distribution circuit for plural power supplies. The current distribution circuit includes a voltage amplifier, a power converting unit having an input electrically connected to an output of the voltage amplifier and having an output electrically connected to a load, a current detecting unit having an input electrically connected to the output of the power converting unit and the load, a diode having an input electrically connected to an output of the current detecting unit and having an output electrically connected to the plural power supplies, a regulable amplifier having an inverting input electrically connected to the output of the current detecting unit and the input of the diode, and having a non-inverting input electrically connected to the output of the diode and the plural power supplies, an adding unit electrically connected to a non-inverting input of the voltage amplifier and an output of the regulable amplifier, and a soft-start circuit electrically connected to the voltage amplifier and the regulable amplifier.

In accordance with the present invention, the plural power supplies are arranged in parallel and include at least a first power supply and a second power supply.

In accordance with the present invention, when the second power supply is operated after the first power supply, an output voltage output from the current distribution circuit to the load is fedback to the soft-start circuit, so that the soft-start circuit is driven and has a voltage, and when a value of the voltage is equal to a proportional value of the output voltage, a surge voltage of the output voltage is lowered.

Preferably, the diode is an equivalent diode.

In accordance with the present invention, the current distribution circuit is a master-slave circuit.

The above aspects and advantages of the present invention will become more readily apparent to those ordinarily skilled in the art after reviewing the following detailed description and accompanying drawings, in which:

BRIEF DESCRIPTION OF THE DRAWINGS

FIG. 1(*b*) is the voltage oscillogram showing the surge phenomenon formed on the master-slave current distribution circuit of FIG. 1(*a*).

FIG. 1(*c*) is the voltage oscillogram showing the soft-start according to the prior art.

FIG. 2(*b*) is the voltage oscillogram showing the soft-start of the circuit of FIG. 2(*a*).

FIG. 3(*b*) is the voltage oscillogram showing the output waveform of the energy gap voltage modulating unit shown on FIG. 3(*a*).

FIG. 3(*c*) is the voltage oscillogram showing the waveform of the circuit without the energy gap voltage modulating unit before the error formed in the parallel power supplies is decreased.

FIG. 3(*d*) is the voltage oscillogram showing the waveform of the circuit having the energy gap voltage modulating unit after the error formed in the parallel power supplies is decreased.

FIG. 3(*e*) is the voltage oscillogram showing the output waveform of the active droop unit shown in FIG. 3(*a*).

FIG. 3(*f*) is the voltage oscillogram showing the waveform of the circuit having the energy gap voltage modulating unit and the active droop unit after the error formed in the parallel power supplies is decreased.

DETAILED DESCRIPTION OF THE PREFERRED EMBODIMENT

The invention is described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1A:
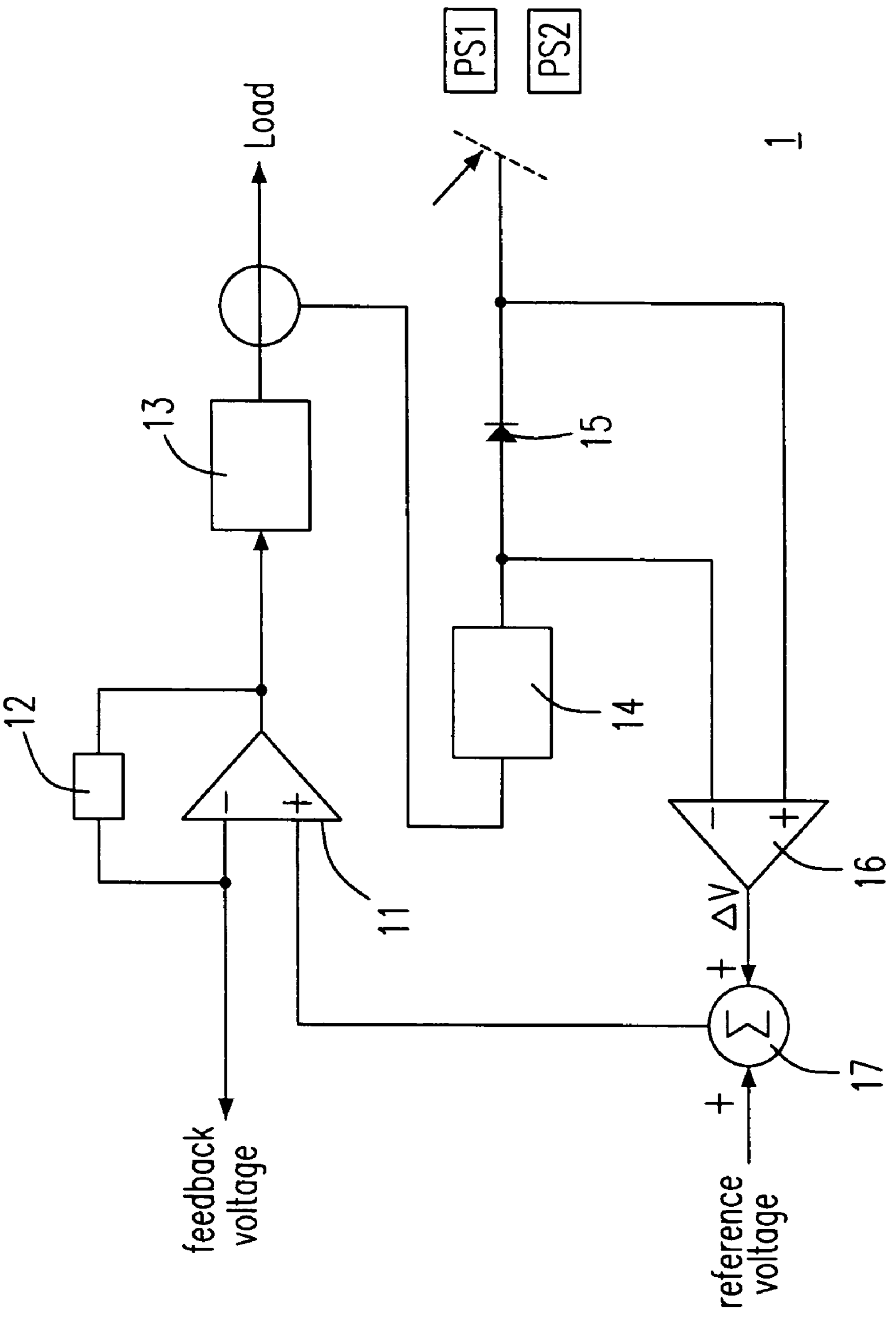
Fig. 1(a)(PRIOR ART)
FIG. 1(*a*) is a schematic view showing the master-slave current distribution circuit according to the prior art.
Figure 1B:
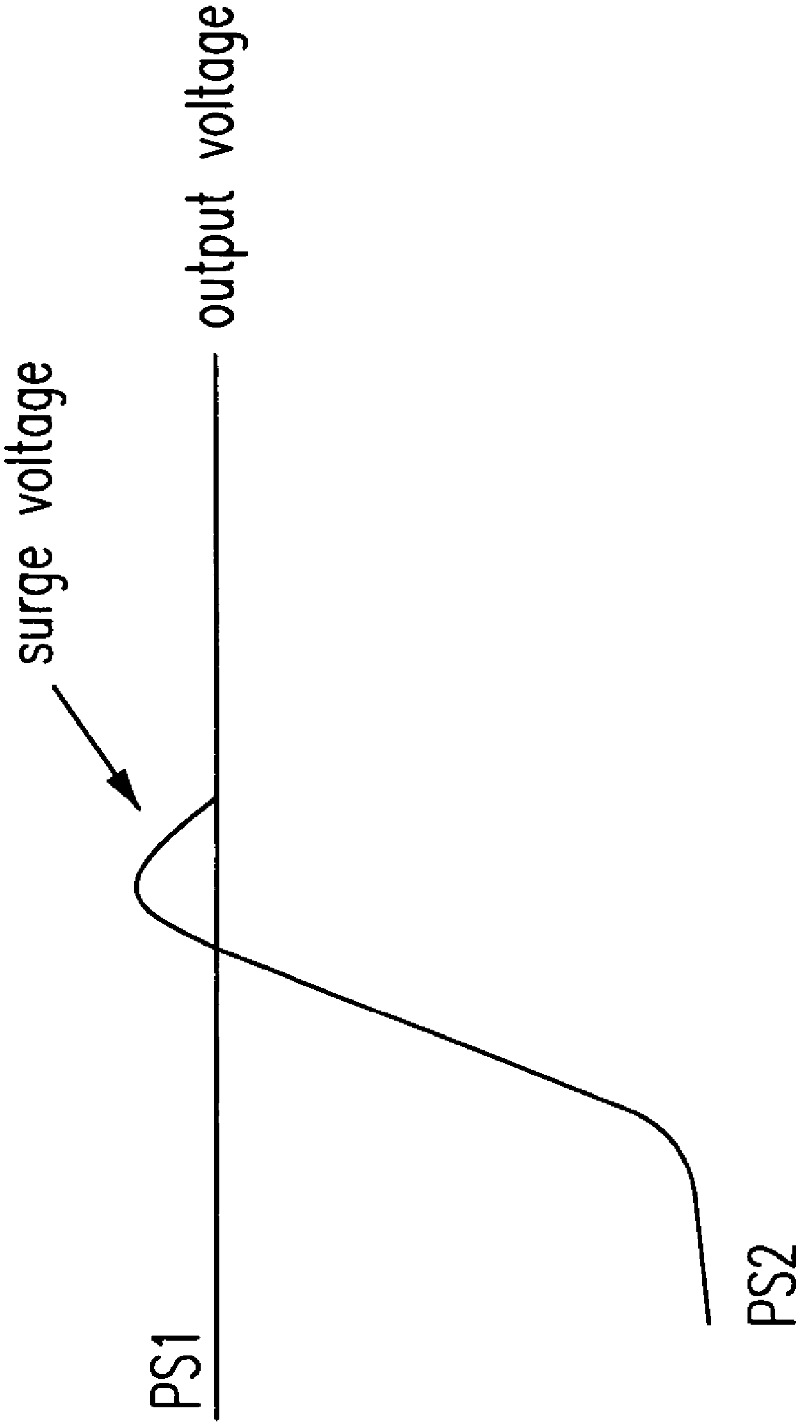
Fig. 1(b)(PRIOR ART)
Figure 1C:
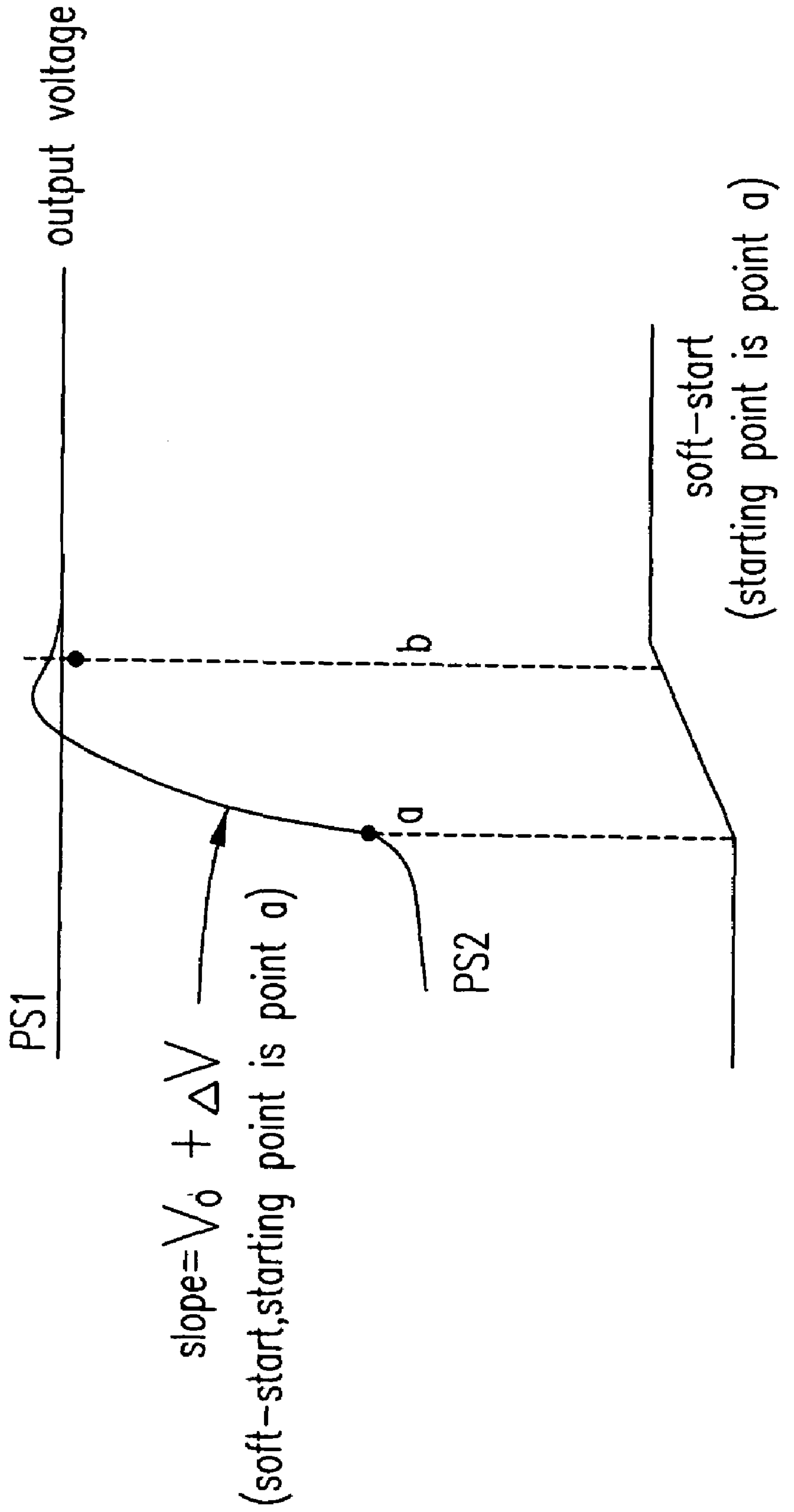
Fig. 1(c)(PRIOR ART)
Figure 2A:
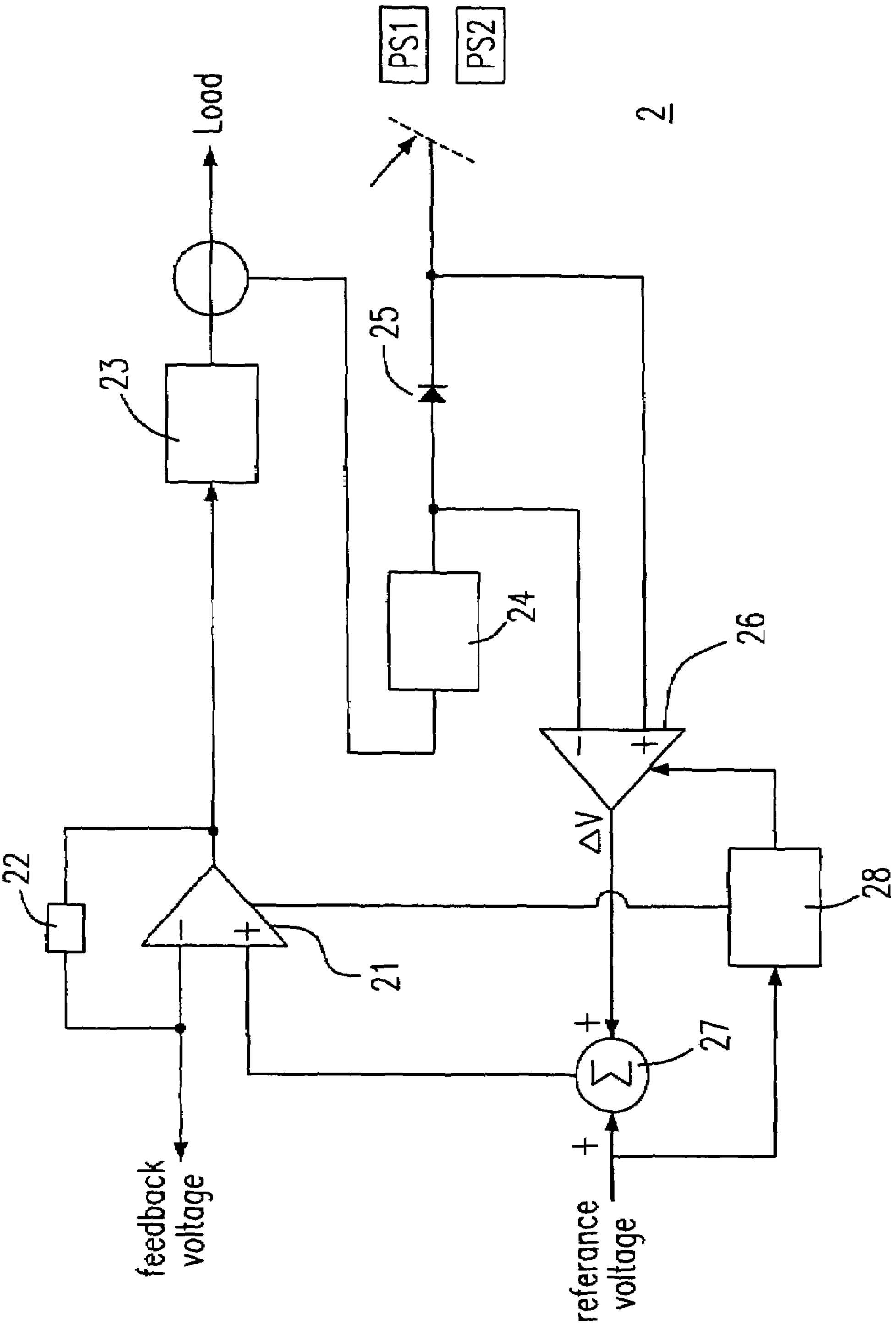
FIG. 2(*a*) is the block view showing the current distribution circuit according to the preferred embodiment of the present invention.
Figure 2B:
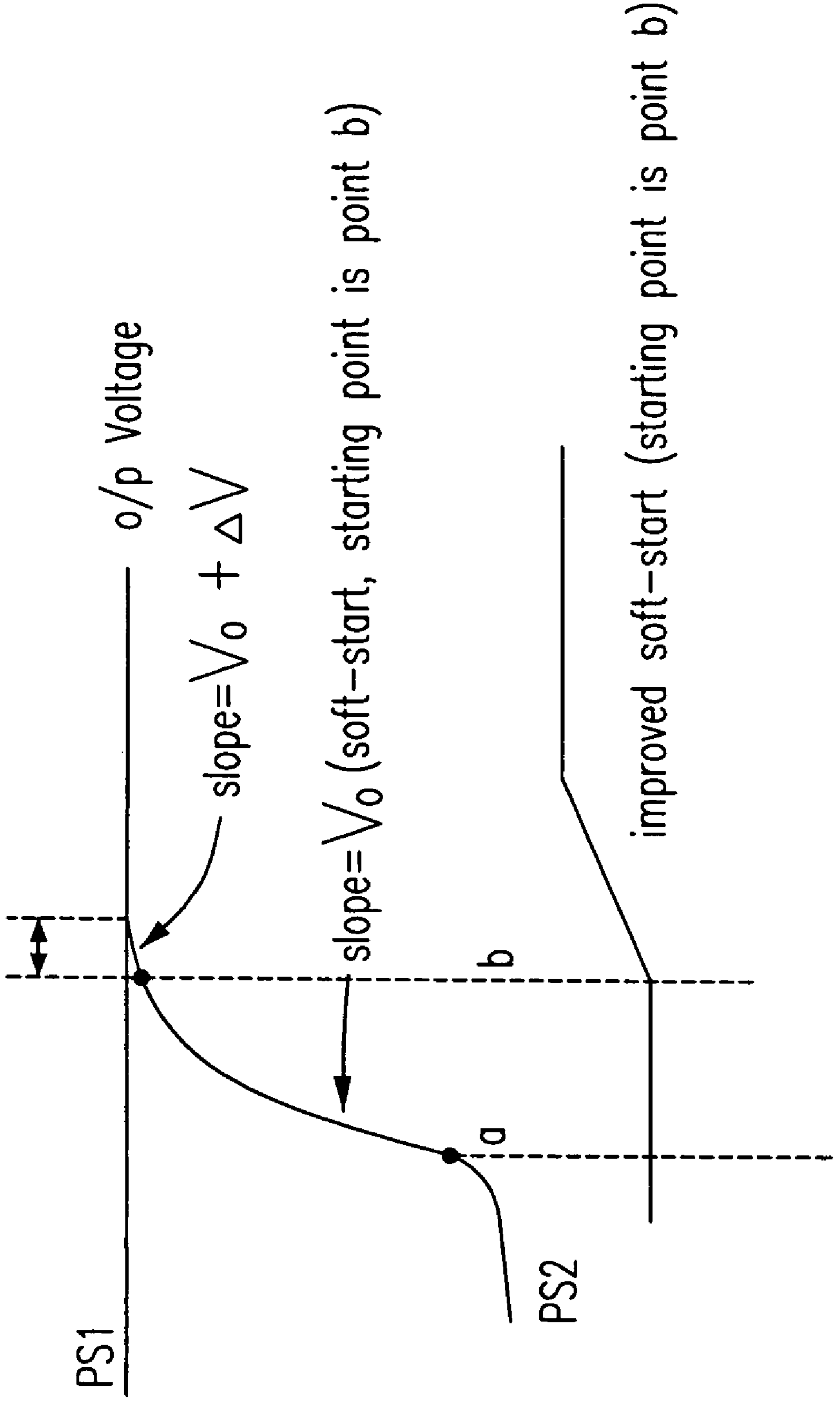
Figure 3A:
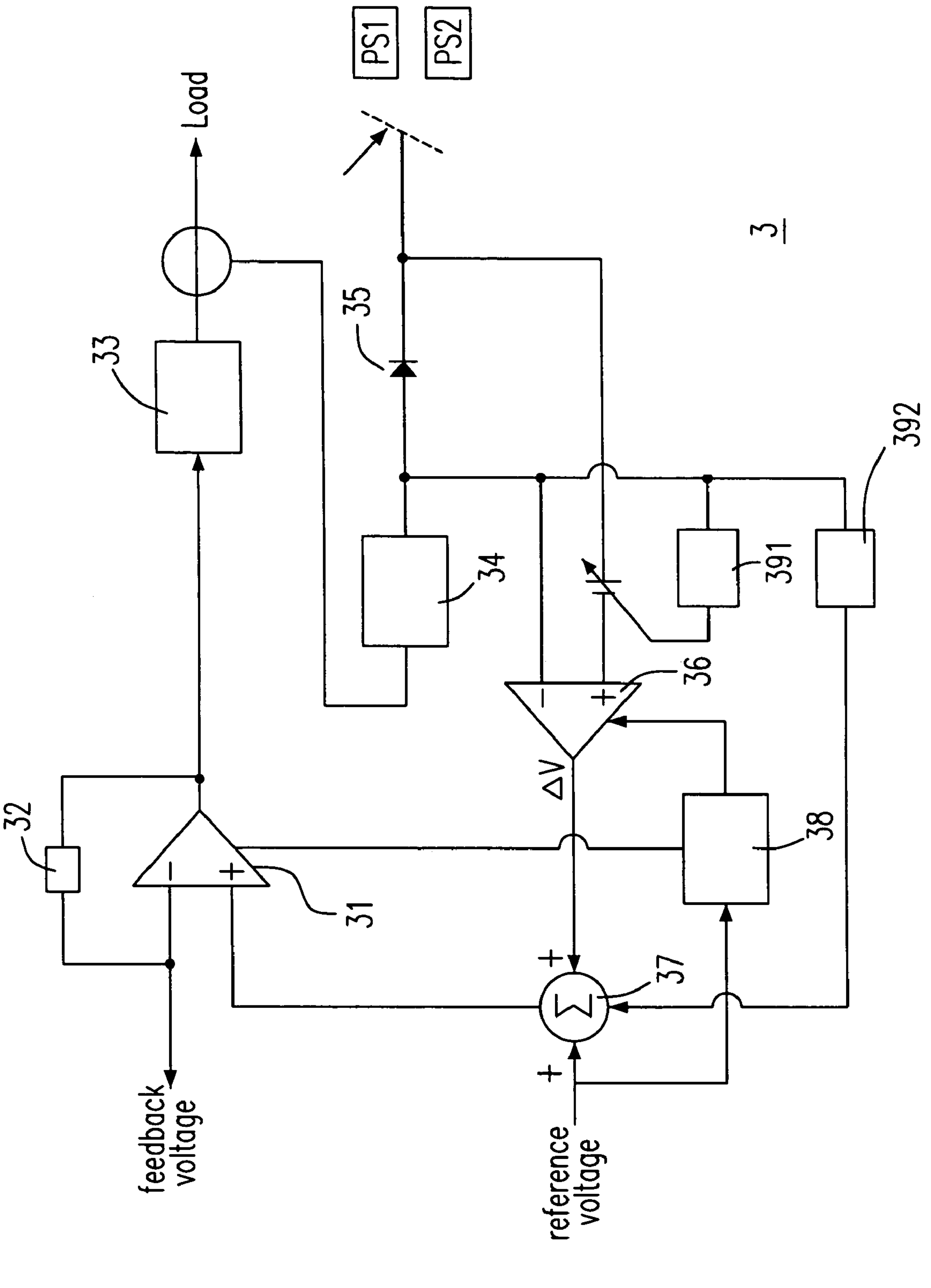
FIG. 3(*a*) is the block view showing the current distribution circuit having the energy gap voltage modulating unit and the active droop unit according to another preferred embodiment of the present invention.
Figure 3B:
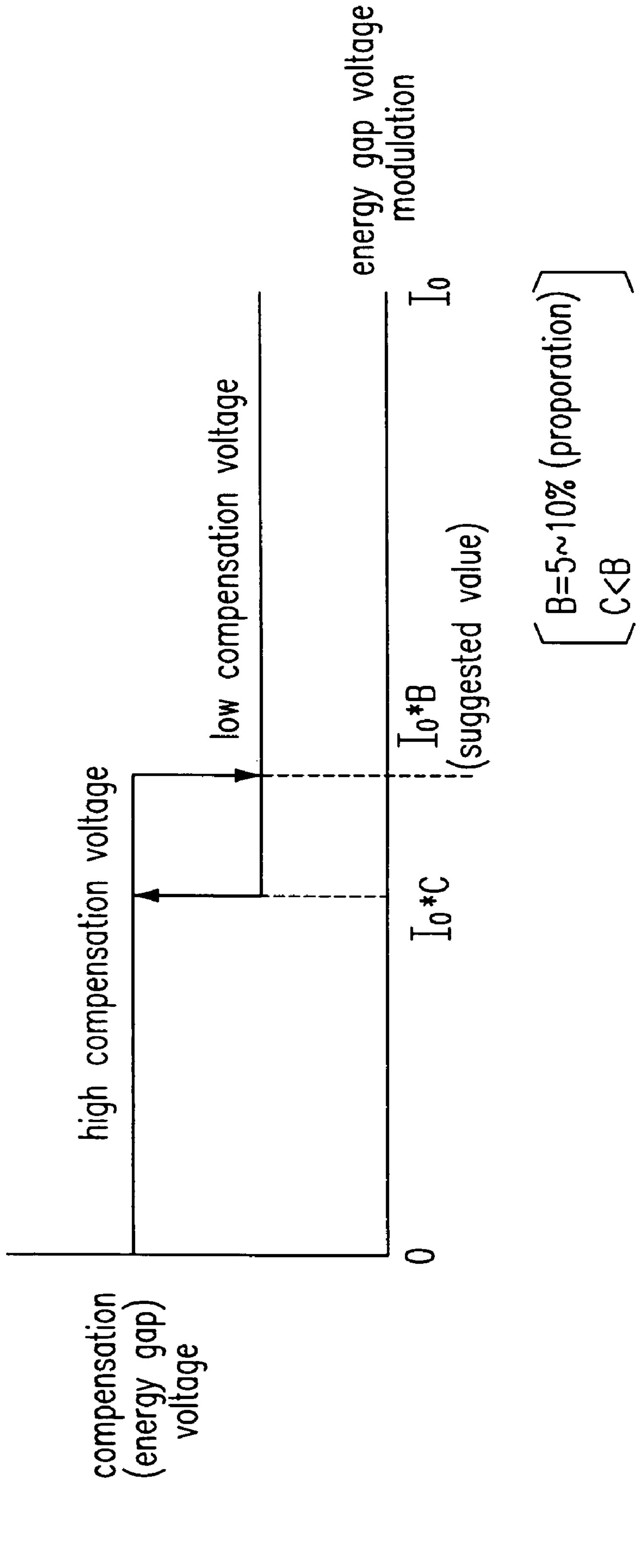
Figure 3C:
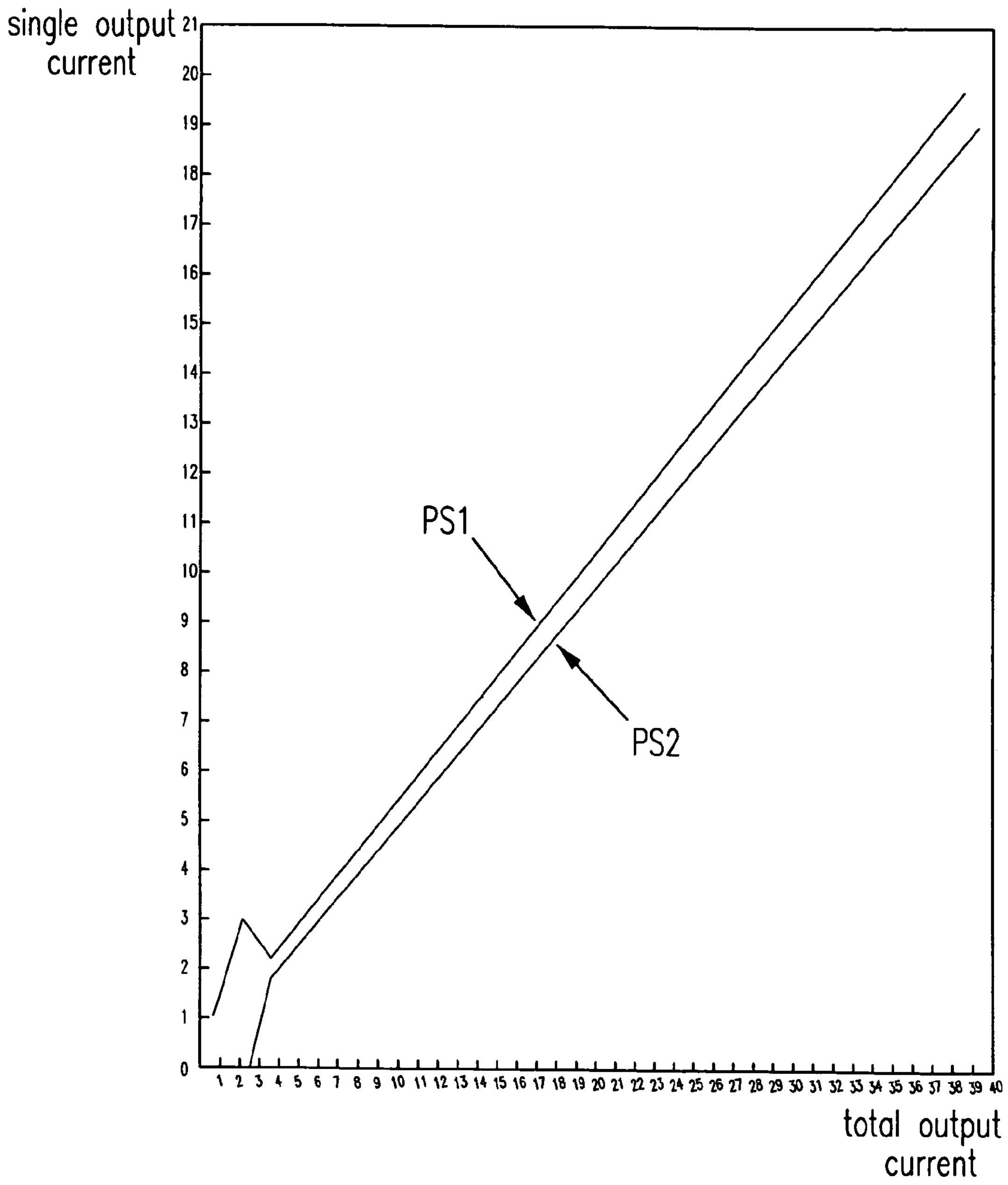
Figure 3D:
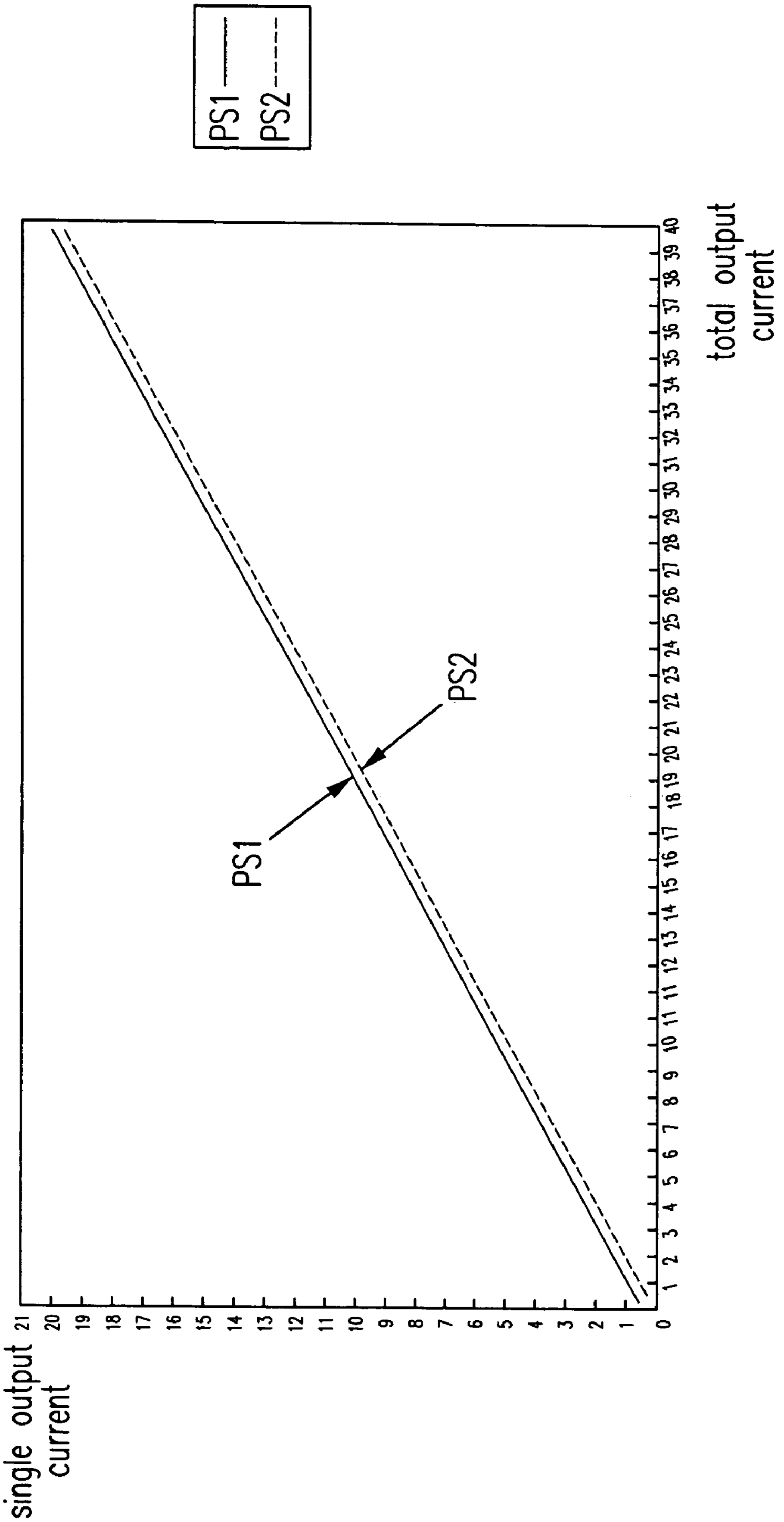
Figure 3E:
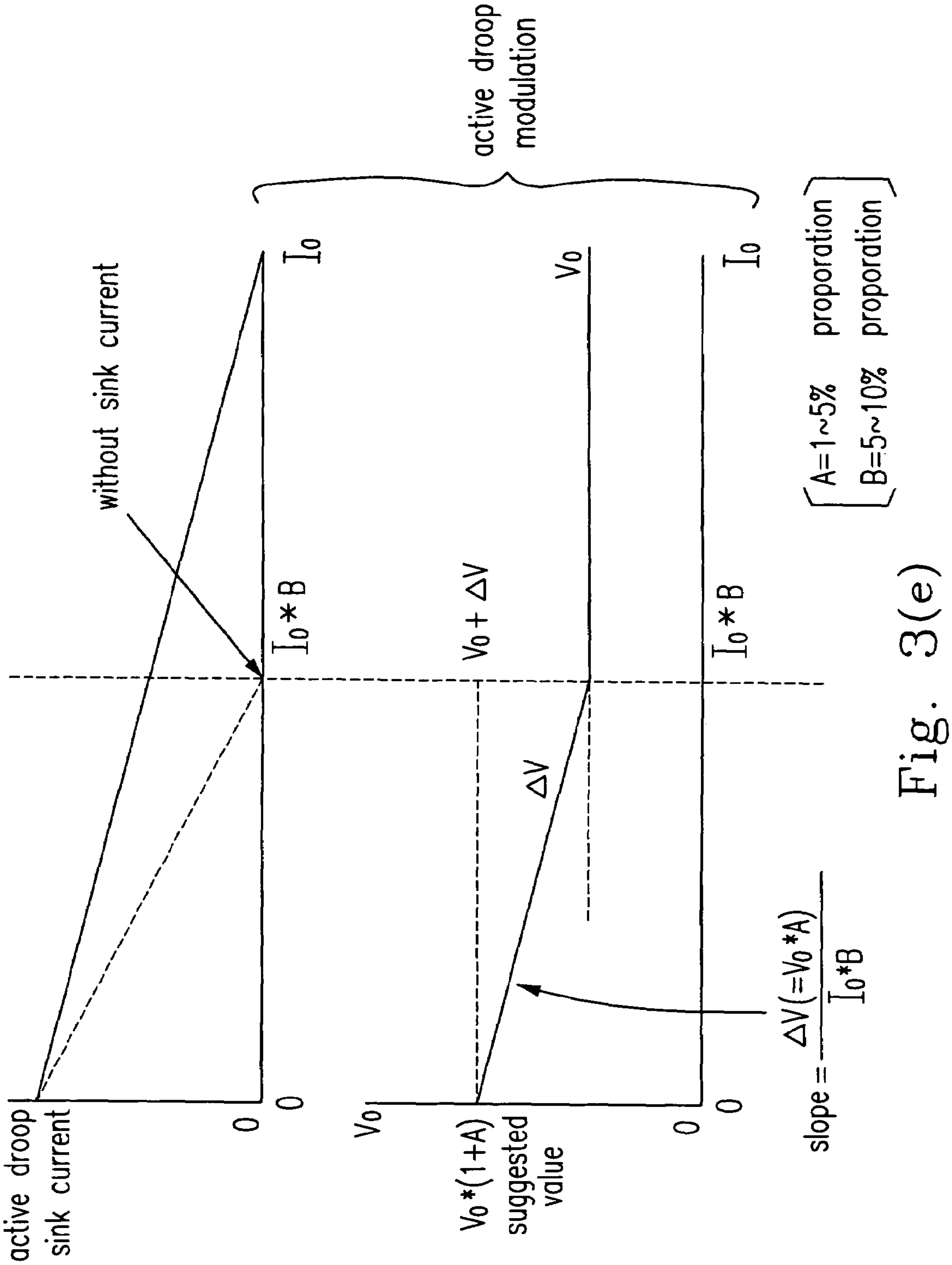
Figure 3F:
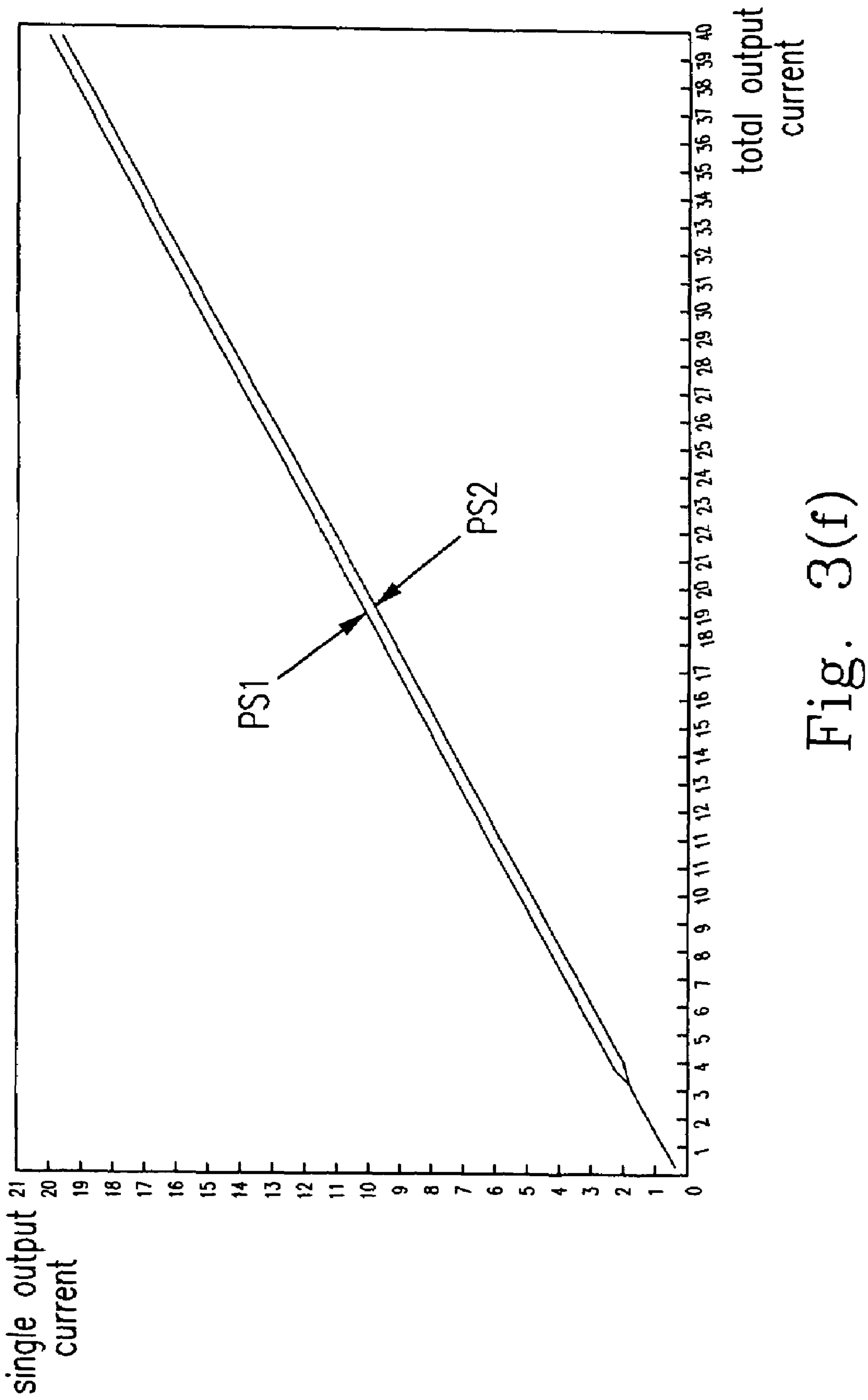

Please refer to FIG. 2(*a*), which is the block view showing the current distribution circuit according to the preferred embodiment of the present invention. The master-slave current distribution circuit 2 is used for the power supply system, wherein the power supply system includes the power supply PS1 electrically connected to the power supply PS2 in parallel. The master-slave current distribution circuit 2 includes the voltage amplifier 21, the impedance 22, the power converting unit 23, the current detecting unit 24, the diode 25, the regulable amplifier 26, the adding unit 27 and the soft-start circuit 28.

The power converting unit 23 has an input electrically connected to the output of the voltage amplifier 21, and has an output electrically connected to the load. The current detecting unit 24 has an input electrically connected to the output of the power converting unit 23 and the load. The equivalent diode 25 has an input electrically connected to an output of the current detecting unit 24 and has an output electrically connected to the parallel power supplies PS1 and PS2. The regulable amplifier 26 has an inverting input electrically connected to the output of the current detecting unit 24 and the input of the equivalent diode 25, and has a non-inverting input electrically connected to the output of the equivalent diode 25 and the parallel power supplies PS1 and PS2. The adding unit 27 is electrically connected to a non-inverting input of the voltage amplifier 21 and the output of the regulable amplifier 26. The soft-start circuit 28 is electrically connected to the voltage amplifier 21 and the regulable amplifier 26.

When the power supply PS2 is electrically connected to the power supply PS1 in parallel by hot plugging, the surge voltage is formed on the output voltage of the power supply PS1. The output voltage output from the current distribution circuit 2 to the load is fed back to the soft-start circuit, so that the soft-start circuit is driven. Referring to FIG. 2, the starting point of the soft-start circuit 28 is set at the point b. When the voltage of the soft-start circuit 28 is equal to 95% of the output voltage of the current distribution, the surge voltage formed on the output voltage of the power supply PS1 is efficiently lowered. Referring to FIG. 2(*b*), the starting point of the soft-start circuit 28 is set at the output voltage, the point b. When the voltage of the soft-start circuit is equal to 90–95% of the output voltage, the surge voltage formed on the output voltage of the power supply PS1 and the power supply PS2 is suppressed.

Please refer to FIG. 3(*a*) showing the block view of the master-slave current distribution circuit according to the preferred embodiment of the present invention. The master-slave current distribution circuit 3 can include the energy gap voltage modulating unit 391, the active droop unit 292 or both.

The energy gap voltage modulating unit 391 is mounted between the output of the current detecting unit 34 and the non-inverting input of the regulable amplifier 36 for modulating the energy gap voltage between the output of the current detecting unit 34 and the non-inverting input of the regulable amplifier 36. Referring to FIG. 3(*b*), the energy gap voltage is raised by the energy gap voltage modulating unit when the value of the load is less than a predetermined value, and is lowered by the energy gap voltage modulating unit when the value of the load is more than the predetermined value, so that the unstability formed from the power supply PS1 and the power supply PS2 under a light load is eliminated, and furthermore the error formed between the power supply PS1 and the power supply PS2 under a heavy load is lowered. FIG. 3(*c*) and FIG. 3(*d*) are voltage oscillograms respectively showing the voltage waveforms before and after the error formed between the parallel power supplies is lowered.

The active droop unit 392 is electrically connected to the output of the current detecting unit 34. Referring to FIG. 3(*e*), when the value of the load is less than the predetermined value (under a light load), the reference value of the operating voltage of the current distribution circuit 3 is decreased by the active droop unit as 1%–5% of the maximal value of the output voltage. Therefore, the master-slave current distribution circuit 3 has a linear slope ΔV, $(V_0 \times A)/(I_0 \times B)$, wherein A is 1%–5%, B is 5%–10%, ΔV is the voltage range of the master-slave current distribution circuit 3, and the $V_0$ is the output voltage.

In accordance with the present invention, the linear operation and the accuracy of the master-slave current distribution circuit 3 is improved, so that the error formed between the parallel power supply PS1 and the power supply PS2 under a light load is lowered when the master-slave current distribution circuit 3 has a smaller load and the voltage difference between the power supply PS1 and the power supply PS2 is broader as shown in FIG. 3(*f*).

Figure 4:
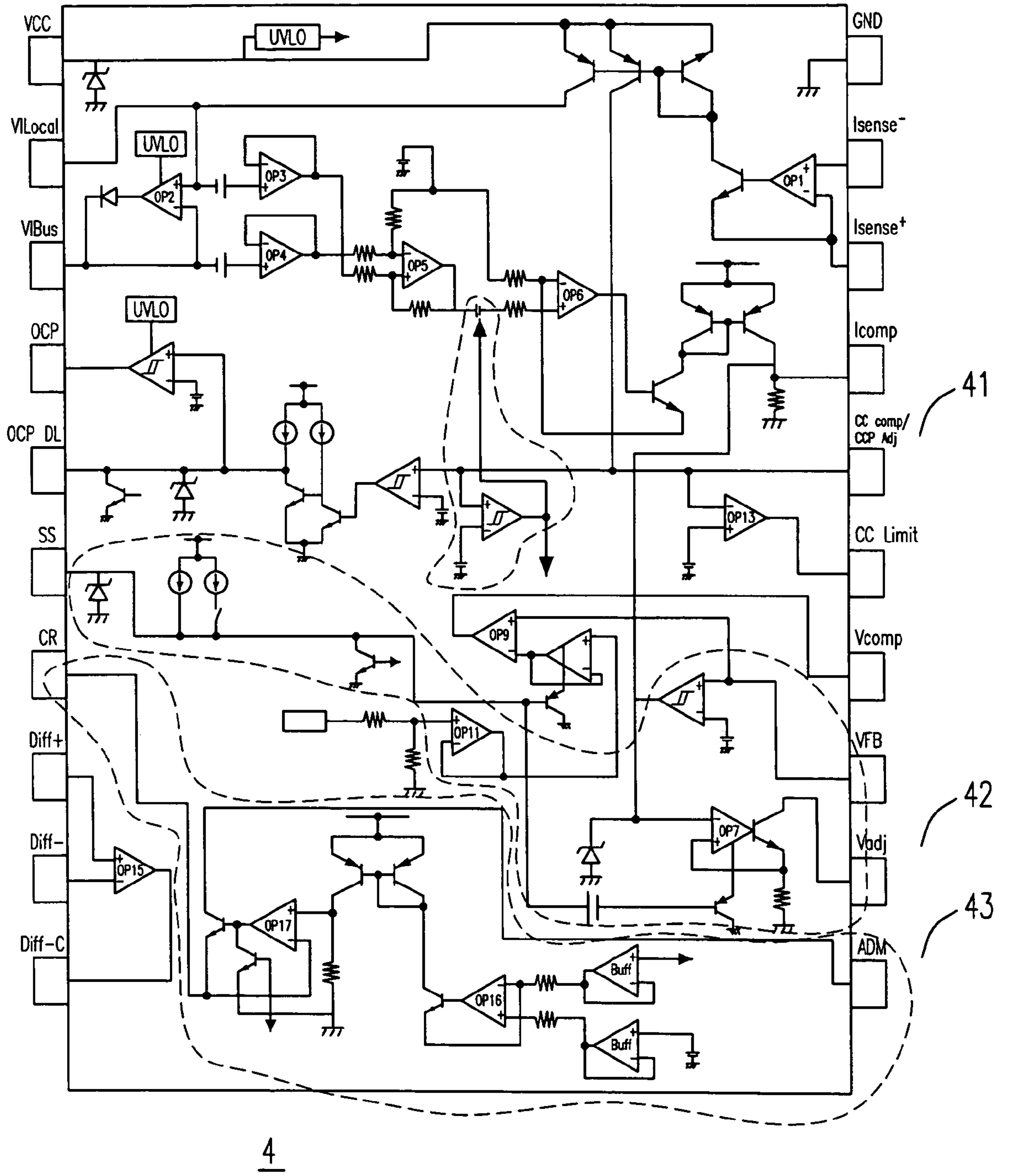
FIG. 4 is the circuit diagram showing the current distribution circuit according to the preferred embodiment of the present invention.

Please refer FIG. 4 showing the master-slave current distribution circuit according to the preferred embodiment of the present invention. In the master-slave current distribution circuit 4, the energy gap voltage modulating unit 41 and the active droop unit 43 can be electrically connected to the soft-active circuit 42 so as to further stabilize the parallel power supply PS1 and the power supply PS2.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A current distribution circuit for parallel power supplies, wherein said power supplies comprises at least a first power supply and a second power supply, said current distribution circuit comprising:

a voltage amplifier;

a power converting unit having an input electrically connected to an output of said voltage amplifier and having an output electrically connected to a load;

a current detecting unit having an input electrically connected to said output of said power converting unit and said load;

an equivalent diode having an input electrically connected to an output of said current detecting unit and having an output electrically connected to said parallel power supplies;

a regulable amplifier having a reverse input electrically connected to said output of said current detecting unit and said input of said equivalent diode, and having a non-reverse input electrically connected to said output of said equivalent diode and said parallel power supplies;

an adding unit electrically connected to a non-reverse input of said voltage amplifier and an output of said regulable amplifier; and a soft-start circuit electrically connected to said voltage amplifier and said regulable amplifier, wherein when said second power supply is operated behind said first power supply, an output voltage output from said current distribution circuit to said load is fedback to said soft-start circuit, so that said soft-start circuit is driven and has a voltage, and when a value of said voltage is equal to a proportional value of said output voltage, a surge voltage of said output voltage is lowered.

2. The current distribution circuit according to claim 1, wherein said voltage amplifier further has a negative feedback circuit.

3. The current distribution circuit according to claim 2, wherein said negative feedback circuit comprises an impedance.

4. The current distribution circuit according to claim 1, wherein said proportional value is in a range from 90% to 95% of said output voltage.

5. The current distribution circuit according to claim 1, further comprising a modulating unit between said output of said current detecting unit and said non-reverse input of said regulable amplifier for modulating an energy gap voltage between said output of said current detecting unit and said non-reverse input of said regulable amplifier.

6. The current distribution circuit according to claim 5, wherein said energy gap voltage is raised by said modulating unit when a first value of said load is less than a predetermined value, and is lowered by said modulating unit when a second value of said load is more than said predetermined value, so that an unstability formed from said first power supply and said second power supply under a light load is eliminated.

7. The current distribution circuit according to claim 6, wherein said output of said current detecting unit is further electrically connected to an active droop unit.

8. The current distribution circuit according to claim 7, wherein a reference value of an operating voltage of said current distribution circuit is decreased by said active droop unit when a value of said load is less than said predetermined value, so that an error formed from said first power supply and said second power supply under said light load is decreased.

9. The current distribution circuit according to claim 8, wherein said reference value is 1%~5% of a value of said output voltage.

10. The current distribution circuit according to claim 1 being a master/slave circuit.

11. A current distribution circuit for plural power supplies, comprising:

a voltage amplifier;

a power converting unit having an input electrically connected to an output of said voltage amplifier and having an output electrically connected to a load;

a current detecting unit having an input electrically connected to said output of said power converting unit and said load;

a diode having an input electrically connected to an output of said current detecting unit and having an output electrically connected to said plural power supplies;

a regulable amplifier having a reverse input electrically connected to said output of said current detecting unit and said input of said diode, and having a non-reverse input electrically connected to said output of said diode and said plural power supplies;

an adding unit electrically connected to a non-reverse input of said voltage amplifier and an output of said regulable amplifier; and a soft-start circuit electrically connected to said voltage amplifier and said regulable amplifier.

12. The current distribution circuit according to claim 11, wherein said plural power supplies are arranged in parallel and comprise at least a first power supply and a second power supply.

13. The current distribution circuit according to claim 12, wherein when said second power supply is operated behind said first power supply, an output voltage output from said current distribution circuit to said load is fedback to said soft-start circuit, so that said soft-start circuit is driven and has a voltage, and when a value of said voltage is equal to a proportional value of said output voltage, a surge voltage of said output voltage is lowered.

14. The current distribution circuit according to claim 11, wherein said diode is an equivalent diode.

15. The current distribution circuit according to claim 11 being a master/slave circuit.

* * * * *